Feb. 8, 1927.
J. B. HENDERSON
SIGHTING TELESCOPE
Filed Sept. 13, 1920
1,616,660
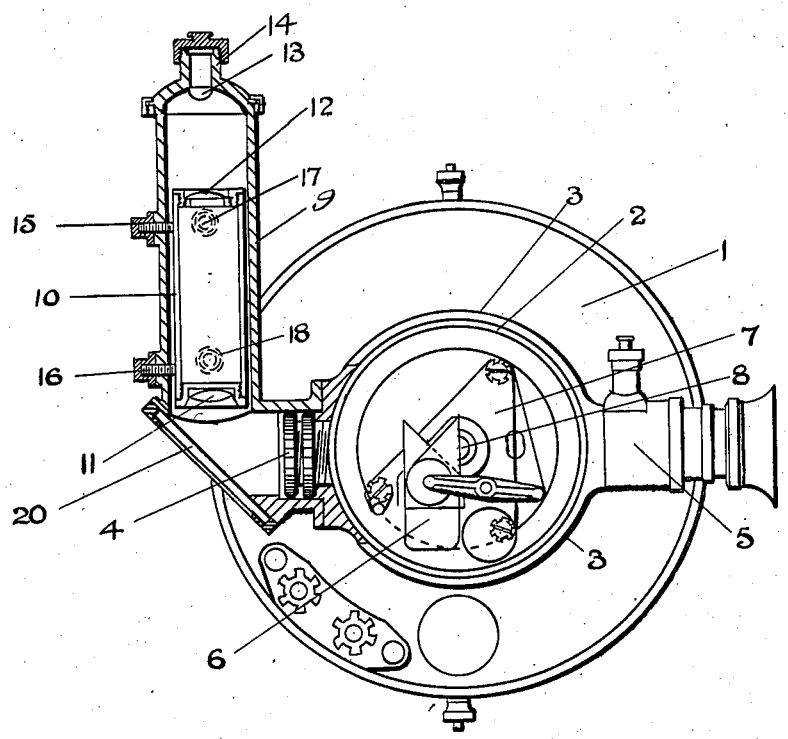
Inventor
James Blacklock Henderson Patented Feb. 8, 1927.

1,616,660

UNITED STATES PATENT OFFICE.

JAMES BLACKLOCK HENDERSON, OF LEE, ENGLAND.

SIGHTING TELESCOPE.

Application filed September 13, 1920, Serial No. 409,860, and in Great Britain October 3, 1919.

My invention relates to sighting telescopes for use on oscillating platforms such as ships, aeroplanes and the like and more especially to telescopes of the type in which the effects of the oscillation of the platform are eliminated from the field of view by hand, gyroscopic or other mechanical control.

When using such a telescope the observer has no idea of the motion of the platform relatively to his line of sight to the target and in some cases it is necessary that he should know the relative position between them. The object of my invention is to provide in the stabilized field of view of the sighting telescope an indication of the motion of the platform relatively to the line of sight.

The figure represents the application of my invention to one of the types of telescopes for use on board ship described in my Patent No. 1,553,077, September 8, 1925. The telescope consists of a casing 1 which has a projecting cylindrical portion 2 which carries the ring 3 into which the objective holder 4 is screwed. The eyepiece 5 is also similarly screwed into the ring 3. The prisms 6 of the telescope are attached to a plate 7 mounted on a trunnion 8 and these prisms are stabilized about the trunnion 8 by means of a gyroscope as described in my copending application, so that they do not partake of any annular motion of the casing 1 about the trunnion 8.

The image of any distant object viewed through the telescope maintains a constant position in the field of view irrespective of the angular motion of the case 1 about the trunnion 8.

In my present invention I desire to give the observer using a telescope of this type, or of any other type in which the field of view is stabilized, some idea of the motion of the outer case 1 relatively to the prisms 6. I attach to the ring 3 a casting 9 of tubular form which contains a collimator 10 having at the lower end an objective 11 and at its upper end a lens 12 upon which a set of cross lines are engraved. These are preferably photographed on the lens in the negative form, the lines being transparent upon a black ground. The lines are rendered luminous by a lamp 13 fitted in a cover 14 which is screwed on to the tube 9. The collimator 10 can be angled relatively to the tube 9 by adjusting screws 15 and 16 in one plane and screws 17 and 18 in a plane at right angles, the collimator being kept against the screws by suitable springs. The cross lines on the graticule 12 are in the focus of the objective 11, and the lamp 13 is in the focus of the lens 12.

A window 20 of plane parallel glass optically worked is fitted to the tubular casing 9 and inclined at 45° to the axes of collimation of the telescope 4—5 and of the collimator 10. The beam of light from the lines of the graticule 12 is rendered parallel by the lens 11 and a portion of it is reflected from the two surfaces of the plane glass window 20. This portion of the beam enters the objective 4, passes through the prisms 6 and forms an image of the lines of the graticule 12 in the focal plane of the eyepiece 5, so that the observer on looking through the eyepiece 5 sees superposed upon the field of view a luminous image of the graticule 12 which is not stabilized but moves up and down in the field of view with every motion of the casing 1 about the trunnion 8. The observer is thus in a position to detect any motion of the casing 1 relatively to the prisms 6.

Having now particularly described and ascertained the nature of my said invention and in what manner the same is to be performed, I declare that what I claim is:—

1. In an optical instrument for use upon an angularly moving platform, a telescopic optical system having a stabilized field of view, and means for superimposing upon the stabilized field of view an image movable in accordance with the movement of the platform.

2. In an optical instrument for use upon an angularly moving platform, a telescopic optical system, means for stabilizing some of its optical parts, means movable with the remaining optical parts for forming in the stabilized field of view a movable image to indicate the motion of the platform relatively to a stabilized line of sight.

3. In an optical instrument for use upon an angularly moving platform, means for compensating for the effect upon its field of view of the angular motion of the platform upon which the instrument is mounted, and means for forming in the field of view an image movable with the platform to indicate its relation to a stabilized line of sight.

4. In an optical instrument for use upon an angularly moving platform, means for compensating for the effect upon its field of view of the angular motion of the platform upon which the instrument is mounted, a graticule adapted to move with the platform, and means for forming in the field of view an image of the graticule to indicate the motion of the platform relatively to a stabilized line of sight.

5. In an optical instrument adapted for use upon an angularly moving platform, a casing carrying some of the optical parts of the instrument and partaking of the angular movement of the platform, said casing being provided with an extension, means for stabilizing the remaining optical parts to compensate for the movement of the platform, a graticule in the extension, means for illuminating the graticule, and means for producing in the stabilized field of view of the instrument an image of the graticule.

6. In an optical instrument adapted for use upon an angularly moving platform, a casing carrying some of the optical parts of the instrument and partaking of the angular movement of the platform, said casing being provided with an extension, means for stabilizing the remaining optical parts to compensate for the movement of the platform, a graticule in the extension, means for illuminating the graticule, and an optical system of refracting and reflecting members for producing in the stabilized field of view of the instrument an image of the graticule.

7. In an optical instrument adapted for use upon an angularly moving platform, a casing carrying some of the optical parts of the instrument and partaking of the angular movement of the platform, means for stabilizing the remaining optical parts to compensate for the movement of the platform, an extension on said casing at an angle to the optical axis of the instrument, a graticule in the extension, means for illuminating the graticule, and means for producing by reflection in the stabilized field of view an image of the graticule.

8. In an optical instrument for use upon an angularly moving platform, a telescope including an eye-piece, an objective and means between the objective and eye-piece to stabilize the view, means movable with the forward end of the telescope for forming an image movable with respect to the field of view as the stabilizing means acts to compensate for the movement of the platform to prevent apparent but unreal movement in the field of view of the image of a distant object.

JAMES BLACKLOCK HENDERSON.